United States Patent

[11] 3,594,909

[72] Inventor Robert A. Schultz
Penn Hills Township, Allegheny County, Pa.
[21] Appl. No. 802,500
[22] Filed Feb. 26, 1969
[45] Patented July 27, 1971
[73] Assignee United States Steel Corporation

[54] APPARATUS FOR MEASURING A DIMENSION OF A MEMBER
16 Claims, 7 Drawing Figs.

[52] U.S. Cl. .................................................... 33/174 PA,
33/174 PC, 33/174 L, 33/143 L, 33/125 T
[51] Int. Cl. .................................................... G01b 7/28
[50] Field of Search............................................ 33/174 L,
174 P, 174 PA, 174 PR, 143 L, 147 L, 147 N, 125
T, 126.75, 172 E; 73/359, 339; 340/244

[56] References Cited
UNITED STATES PATENTS

| 3,226,833 | 1/1966 | Lemelson | 33/174 X |
| 3,239,939 | 3/1966 | Aller | 33/174 |
| 3,481,042 | 12/1969 | Lemelson | 33/174 |
| 3,481,043 | 12/1969 | Esch | 33/174 |

Primary Examiner—Leonard Forman
Assistant Examiner—Gary G. Kuehl
Attorney—R. J. Leek, Jr.

ABSTRACT: An apparatus for the contour measurement of a dimension of a member, defined by opposed contours has a frame and opposed sensing assemblies aligned adjacent the contours. Each of the sensing assemblies has a guide on the frame disposed adjacent to a contour; a mount reciprocable on the guide, a first drive connected to the mount for reciprocating the mount on the guide adjacent the contour; a probe reciprocable in the mount between an initial position away from the contour, a probe contact position which provides zero settings for the apparatus and a probe measuring position in engagement with the contour; a second drive connected to the probe for reciprocating the probe between the initial position, the probe contact position and the probe measuring position; and a first signal device associated with the probe and operable to produce a zero signal when the probe is in the probe contact position and to produce a measurement signal when the probe is in the probe measuring position. A control device is connected to the first drive, the second drive and the first signal device. The control device causes the first drive to move the probe along the contour; and causes the second drive to move the probe between the initial position, the probe contact position and the probe measuring position.

PATENTED JUL 27 1971
3,594,909
SHEET 1 OF 4
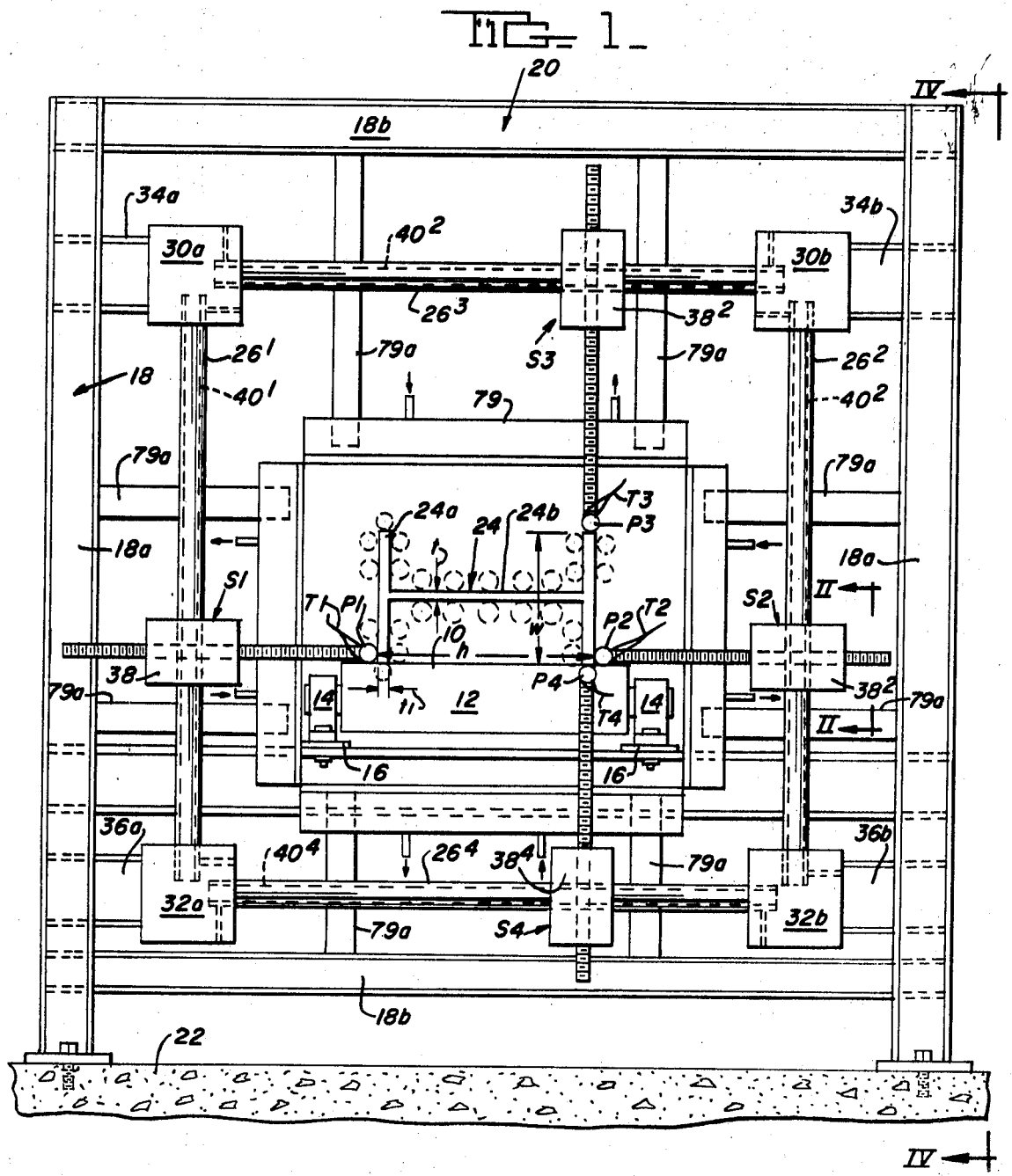
FIG. 1
INVENTOR
ROBERT A. SCHULTZ
By
Attorney

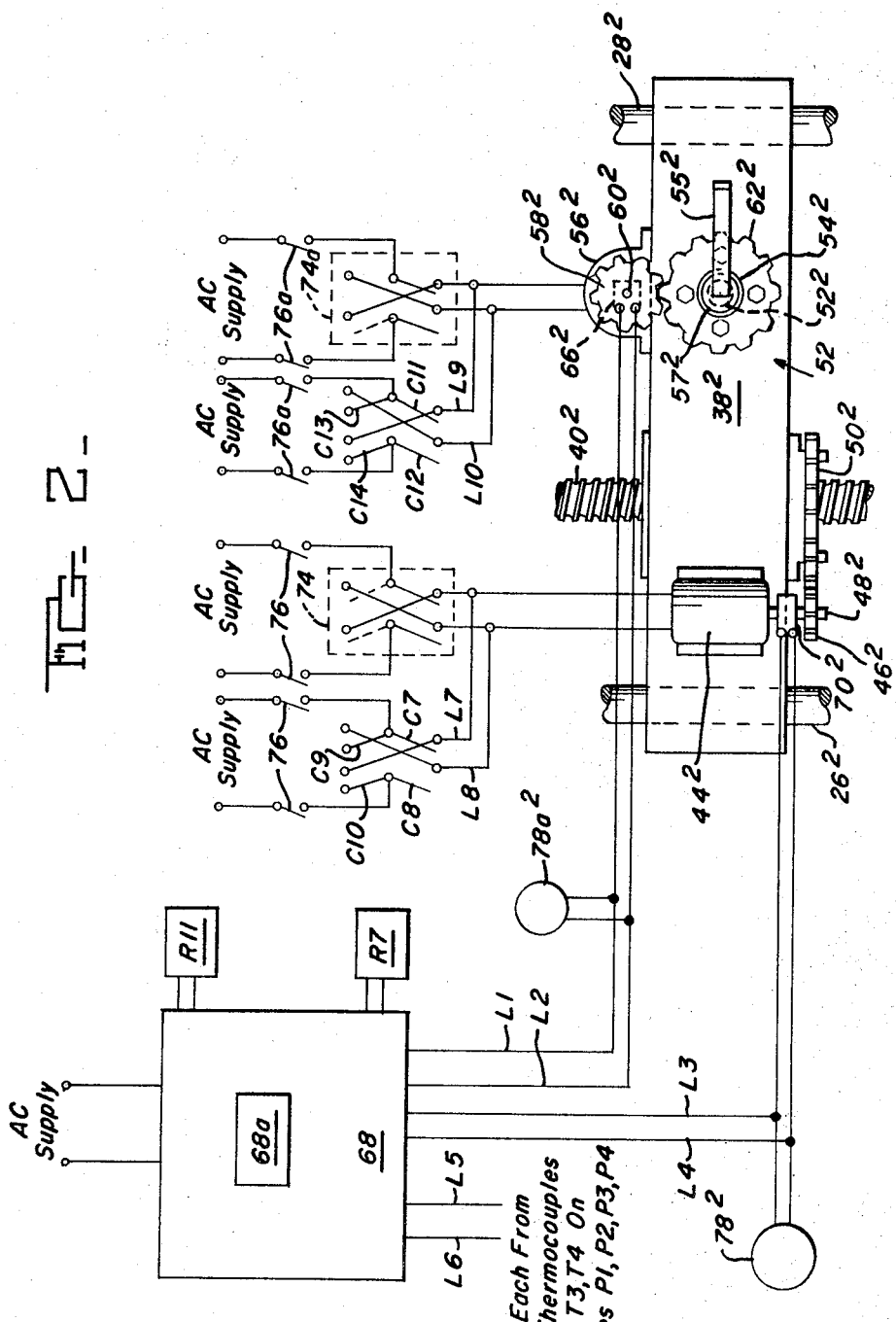

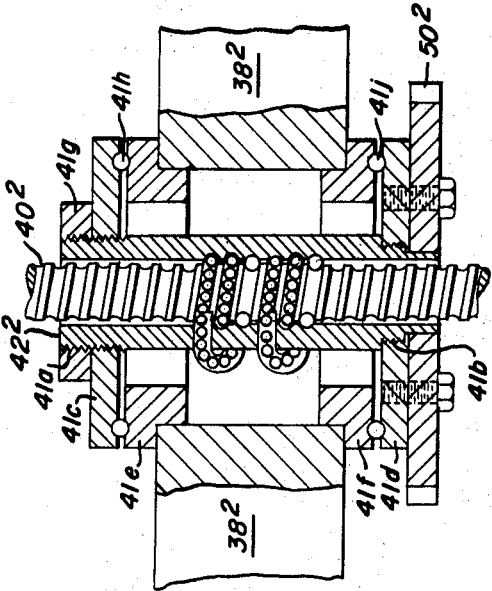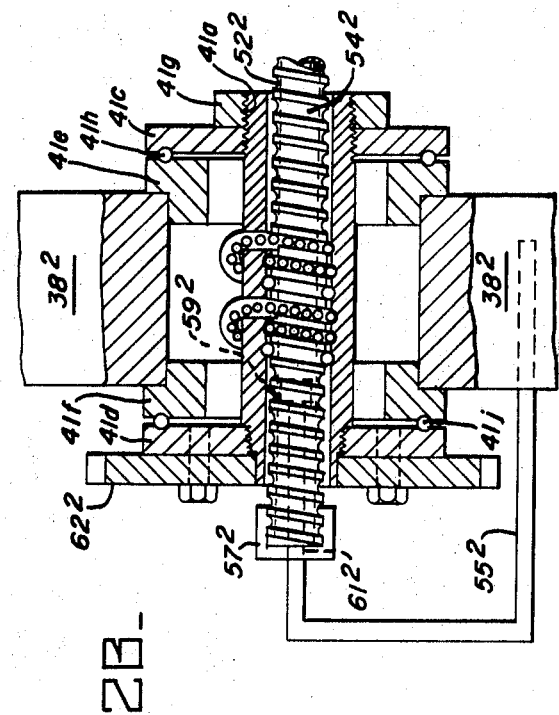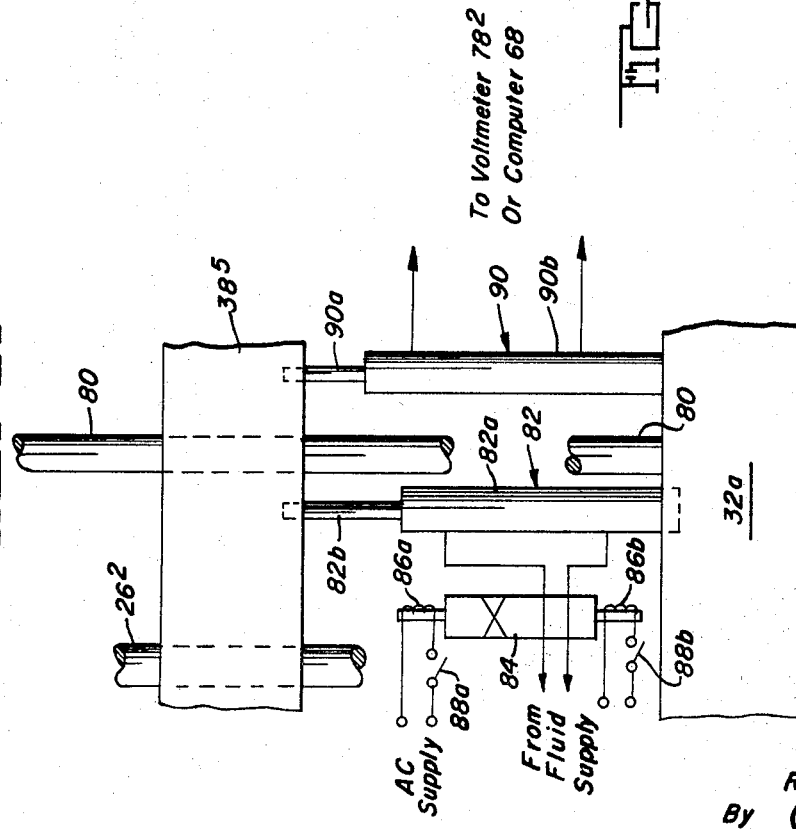

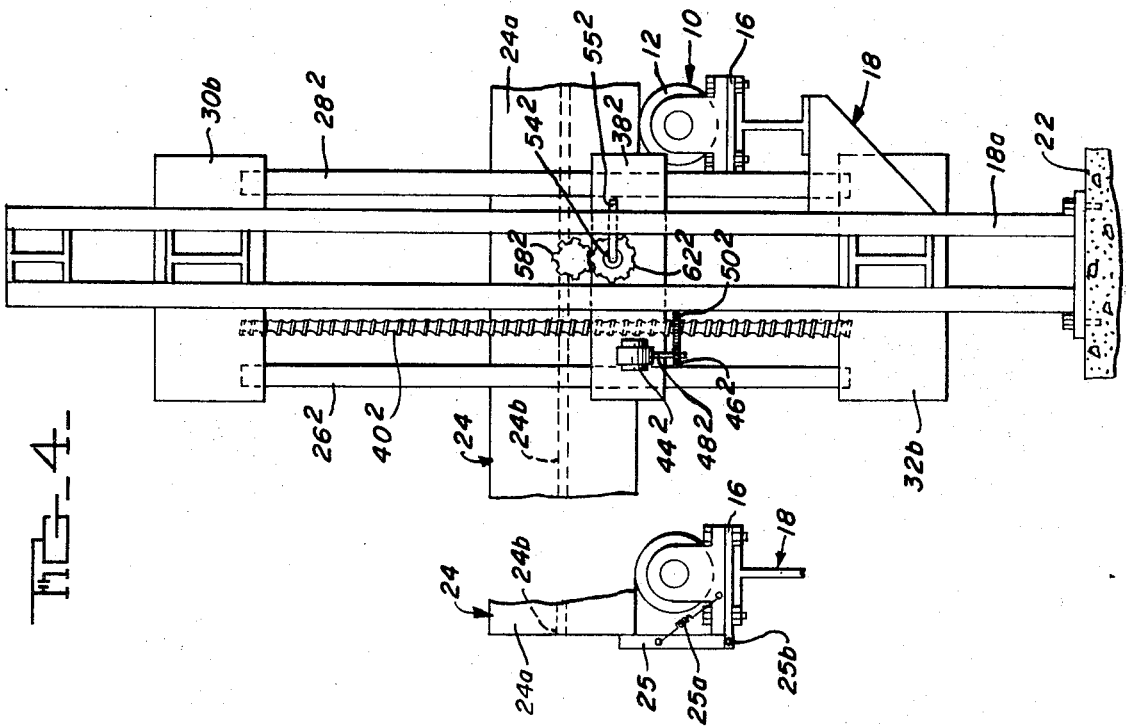
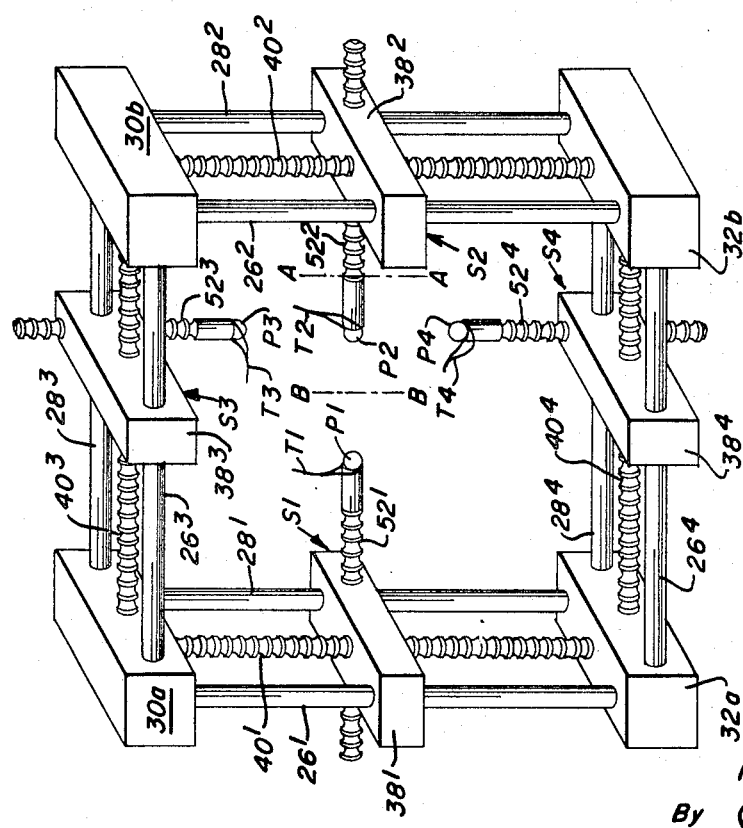

3,594,909

1

APPARATUS FOR MEASURING A DIMENSION OF A MEMBER

BACKGROUND OF THE INVENTION

Presently, a member, such as for example a wide flange beam being formed in a rolling mill, is tested for dimensional accuracy and symmetry of its flanges and webs with respect to a vertical or horizontal axis after such beam has been rolled. It is customary practice for a sample piece, about 1 foot long, to be cut from the beam while the beam is still near the rolling temperature (about 1600° F.), which sample piece is then allowed to cool and upon reaching about ambient or room temperature is checked manually for dimensional deviation and symmetry deviation. The cooling and checking period is time consuming and occurs when the original beam has reached a distant point from the sampling point.

Conventional apparatus of this type is shown in the following U.S. Pat. Nos.: 1,814,354 to Webster et al. issued 7/14/31; 1,969,536 to Winne issued 8/7/34; 1,977,619 to Boyer et al. issued 10/23/34; 2,592,157 to Kendall issued 4/8/52; 2,692,045 to Stalhandske et al. issued 10/19/54; 2,748,937 to Casler et al. issued 6/5/56; 3,032,192 to Uhlig issued 5/1/62; 3,080,659 to Wolford issued 3/12/63; 3,088,591 to Perthen et al. issued 5/7/63; 3,140,545 to Murtland issued 7/14/64; 3,172,311 to Kendall issued 3/9/65; 3,218,066 to Halberschmidt et al. issued 11/16/65; 3,247,964 to Doud et al. issued 4/26/66; 3,278,023 to Schneider issued 10/11/66; British Pat. No. 879,277 to Square D. Co. issued 10/11/61.

OBJECTS OF THE INVENTION

It is the general object of this invention to avoid and overcome the foregoing and other difficulties of and objections to prior art practices by the provision of apparatus for measuring a dimension of a member, which apparatus:

a. tests the dimensional accuracy and symmetry deviation of the member automatically,
b. determines the required dimensional and deviation characteristics of the member while such member is at operating temperature and at a test point on the manufacturing line in which the member is being processed,
c. eliminates the cutting of a sample from the member and the associated cooling period for cooling the sample to room temperature,
d. permits the conversion of the test results at operating temperature to room temperature by automatic calibration, a calibration chart or the like,
e. is operable to handle a wide range of members and to cover a wide variety of test positions on the member for one fixed position of the apparatus,
f. is operable to determine waviness and symmetry of the member, and
g. provides contour measurement of a dimension of a member defined by opposed contours of the member.

BRIEF SUMMARY OF THE INVENTION

The aforesaid objects of this invention, and other objects which will become apparent as the description proceeds, are achieved by providing an apparatus for the contour measurement of a dimension of a member, the dimension being defined by opposed contours. The apparatus has a frame, a sensing means on the frame adjacent the member and having opposed sensing assemblies aligned adjacent the contours. Each of the sensing assemblies has guide means on the frame disposed substantially parallel to a contour; mounting means reciprocable on the guide means; a first drive means connected to the mounting means for reciprocating the mounting means on the guide means adjacent the contour; a probe reciprocable in the mounting means between an initial position away from the contour, a probe contact position which provides zero settings for the apparatus and a probe measuring position in engagement with the contour; a second drive means connected to the probe for reciprocating the probe between the initial position, the probe contact position and the probe measuring position; and a first signal means associated with the probe and operable to produce a zero signal when the probe is in the probe contact position and to produce a measurement signal when the probe is in the probe measuring position. Control means are connected to the first drive means, the second drive means and the first signal means. The control means are operable to cause the first drive means to move the probe along the contour; to cause the second drive means to move the probe between the initial position, the probe contact position and the probe measuring position; and to receive the zero signal and the measurement signal, to cause the correlation of the zero signal and the measurement signal and the printing of a record of the dimension.

BRIEF DESCRIPTION OF THE SEVERAL VIEWS OF THE DRAWINGS

For a better understanding of this invention reference should be had to the accompanying drawings, wherein like numerals of reference indicate similar parts throughout the several views and wherein:

FIG. 1 is a fragmentary end elevational view of a conveyor, a member, such as a structural beam being carried by the conveyor, and the apparatus of this invention for the contour measurement of the member, FIG. 2 is a fragmentary schematic side elevational view of the one sensing means and its first drive means and its second drive means taken along the line II–II of FIG. 1 in the direction of the arrows, FIG. 2A is a fragmentary cross-sectional view of the ball bearing screw assembly for the first drive means, FIG. 2B is a view showing how the helical screw of the second drive means is restrained from rotation but permitted to reciprocate, FIG. 3 is an isometric view of the apparatus with the first drive means and the second drive means for the sensing assemblies and heat-protecting shields removed for clarity, FIG. 4 is a side elevational view of the apparatus shown in FIG. 1 and taken along the line IV–IV of FIG. 1 in the direction of the arrows, and FIG. 5 is a fragmentary view similar to FIG. 2 of an alternative embodiment of the first drive means utilizing a fluid cylinder and transducer.

Although the principles of this invention are broadly applicable to the contour measurement of a dimension of a member, this invention is particularly adapted for use in conjunction with the dimensional measurement of a structural beam and hence it has been so illustrated and will be so described.

DETAILED DESCRIPTION

With specific reference to the form of this invention illustrated in the drawings, and referring particularly to FIGS. 1, 4, a conveyor is indicated generally by the reference numeral 10. This conveyor 10 has a plurality of rolls 12 (FIGS. 1,4) journaled in bearings 14 (FIG. 1) mounted on a base 16 (FIGS. 1,4) supported by a frame 18 (FIG. 4) of the apparatus 20 of the present invention.

The frame 18 (FIGS. 1,4) for the apparatus 20 comprises a pair of vertical frame members 18a upstanding from ground level 22 and a pair of horizontal frame members 18b (FIG. 1) connected to the vertical frame members 18a.

The apparatus 20 of the present invention is utilized for the contour measurement of a member, such as a structural beam 24 (FIGS. 1,4) and, for example, a dimension $h$ (FIG. 1) of such beam 24 as defined by opposed contours of the outside of the flanges 24a FIGS. 1,4) of the beam 24. The beam 24 is positioned for the measurement on the conveyor 10 by a stop 25 (FIG. 4) biased in position by a spring 25a and pivoted at 25b.

APPARATUS 20

In addition to the frame 18, the apparatus 20 has a sensing means, such as a plurality of sensing assemblies S1,S2, (FIGS. 1,3) for measuring the dimension $h$ and other dimensions and sensing assemblies S3,S4 (FIGS. 1,3) for among other purposes measuring a dimension $w$ (FIG. 1), the width of the flanges 24a. It will be understood that the sensing assemblies S3,S4, can cooperate to measure the thickness $t$ (FIG. 1) of the web 24b; and that the sensing assemblies S1,S3 and S2,S4 can measure the thickness $t_1$ (FIG. 1) of the flanges 24a.

Probe P1 (FIGS. 1,3) contacts the top of the left-hand flange 24a (FIG. 1); probe P2 contacts the top of the right-hand flange 24a (FIG. 1); probe P3 contacts the top edge of both flanges 24a (FIG. 1), the inner side of both flanges 24a (FIG. 1) above the web 24b, and the top of the web 24b and can also contact the surface contacted by P1; and the probe P4 contacts the bottom edges of both flanges 24a (FIG. 1), the inner side of both flanges 24a (FIG. 1) below the web 24b and the bottom of the web 24b and can also contact the surface contacted by P2. It will be understood that probes P3,P4 can provide all measurements if immediate measurement of a particular dimension is required by sequentially contacting opposing surfaces of the beam components.

The above functions of the sensing means are summarized in the following table:

| | |
|---|---|
| Flange thickness $t$ | S2,S3 right flange 24a above web 24b, S2,S4 right flange 24a below web 24b, S1,S3 left flange 24a above web 24b, and S1,S4 left flange 24a below web 24b. |
| Web thickness $t$ | S3,S4. |
| Flange width $w$ | S3,S4. |
| Beam height $h$ | S1,S2 or S3,S4. |

The sensing means are mounted on the frame 18 adjacent the beam 24 and have the opposed sensing assemblies S1,S2 or S3,S4, etc., aligned adjacent the contours of the beam 24 to be measured. Since the sensing assemblies S1, S2, S3, S4 are similar, it is deemed sufficient to describe only the sensing assembly S2 in detail.

SENSING ASSEMBLY S2

The sensing assembly S2 (FIGS. 1,3) has guide means, such as the guide rods $26^2,28^2$ mounted between and attached to blocks $30b,32b$ (FIG. 3) which blocks $30b,32b$ (FIGS. 1, 3, 4) are mounted by brackets $34b,36b$ (FIG. 1) from the frame member 18a. Mounting means, such as the block $38^2$ is reciprocable on the guide rods $26^2,28^2$. For the purpose of reciprocating the block $38^2$ (FIGS. 1, 2A, 2B, 3, 4) on the guide rods $26^2,28^2$ a first drive means (FIG. 2) is connected to the block $38^2$.

FIRST (BLOCK) DRIVE MEANS

Referring particularly to FIGS. 2,2A the first drive means has a first or fixed helical screw $40^2$ (FIGS. 1, 2, 2A, 3, 4) affixed at its ends to the blocks $30b,32b$ to prohibit rotation of the screw $40^2$. A first rotatable member, such as the helical ball bearing nut $42^2$ (FIG. 2A) of a ball bearing screw assembly, such as manufactured by Saginaw Steering Gear Division, General Motors Corporation, Saginaw, Michigan (FIG. 2) is rotatable on or (in this case) in the block $38^2$ and on the first helical screw $40^2$. The nut $42^2$ has threaded end portions 41a,41b for reception thereon of hardened bearing races 41c,41d (FIGS. 2A,2B). The races 41c,41d cooperate with races 41e,41f (FIGS. 2A,2B) which are press fitted on the block $38^2$. Lock nut 41g (FIGS. 2A,2B) secures the race 41c in a position to give the desired bearing fit to balls 41h,41j. In order to rotate the helical nut $42^2$, a motor $44^2$ (FIGS. 2,4) has a gear $46^2$ on its shaft $48^2$ which gear $46^2$ drives a gear $50^2$ on the helical nut $42^2$. The gear $50^2$ is not affixed to the first helical screw $40^2$.

The probe P2 (FIGS. 1,3) is reciprocable in the block $38^2$ between an initial position away from the contour (i.e. beam 24 indicated by the line A–A, FIG. 3), a probe contact position which provides zero settings for the apparatus 20 (indicated by the line B–B, FIG. 3) and a probe measuring position in engagement with the contour (FIG. 1). A second drive means is connected to the probe P2 for reciprocating the probe P2 between such initial position, such probe contact position and such probe measuring position.

SECOND (PROBE) DRIVE MEANS

As shown in FIGS. 2,2B the second drive means has a second or movable hollow helical screw $52^2$ on the probe P2 and a second rotatable member, such as a helical ball bearing nut $54^2$ (FIGS. 2, 2A, 4), is rotatable on or (in this case) in the block $38^2$ and on the second hollow helical screw $52^2$ (FIG. 2). As in the case of the first drive means, a motor $56^2$ (FIG. 2) drives a gear $58^2$ (FIGS. 2, 4) on the motor shaft $60^2$, which gear $58^2$ drives another gear $62^2$ affixed to the helical nut $54^2$. The ball bearing screw assembly (FIG. 2B) for the second or probe drive means is similar to the ball bearing screw assembly for the first or block drive means (FIG. 2A). In FIG. 2B, however, a guide rod $55^2$ is affixed to the block $38^2$ and extends through guide cap $57^2$ attached to the screw $52^2$ on the end of the screw $52^2$ opposite the probe P2 and is attached to guide block $59^2$ (FIG. 2B). The guide block $59^2$ maintains the guide rod $55^2$ centrally within the hollow screw $52^2$. The opening $61^2$ (FIG. 2B) in guide cap $57^2$ closely fits the polygonal cross section of the guide rod $55^2$ to prevent rotation of the screw $52^2$ while permitting reciprocating movement of the screw $52^2$ and the probe P2 and the respect to the block $38^2$.

A first signal means is associated with the probe P2 and is operable to produce a zero signal when the probe P2 is in the probe contact position (line B–B, FIG. 3) and to produce a measurement signal when the probe is in the probe measuring position (in engagement with the contour, FIG. 1) that senses when contact between the probe P2 and the member 24 is made so that the probe position at that time can be recorded and the probe direction reversed.

FIRST SIGNAL MEANS

In order to indicate the position of the probe P2 with respect to the block $38^2$, a first signal means, suitably a shaft encoder $66^2$ (FIG. 2) of the type manufactured by Vermitron Corporation, Farmingdale, Long Island, New York, 11735, is mounted on the shaft $60^2$ of the motor $56^2$ to measure rotation of shaft $60^2$ and therefore axial motion of the probe P2, and is connected by lines L1,L2, (FIG. 2) to the control means, suitably a computer 68 similar to a model PDP-8computer manufactured by Digital Equipment Corporation, Maynard, Massachusetts.

SECOND SIGNAL MEANS

For the purpose of indicating the position of the block $38^2$ and for transmitting a second output signal to the computer 68, the computer 68 has a second signal means, a shaft encoder $70^2$ (FIG. 2) similar to the shaft encoder $66^2$ mounted on the shaft $48^2$ of the motor $44^2$ and is connected to the computer 68 by lines L3,L4. Shaft encoder $70^2$ senses rotation of shaft $48^2$ and thereby permits calculation of the linear motion of sensing assembly S2 along helical Screw $40^2$.

TEMPERATURE-RESPONSIVE MEANS

As shown in FIGS. 1 and 3 temperature measurement means, such as a thermocouple T2, is connected to the probe P2 (to sense contact of the probe P2 with the beam 24) and to the computer 68 by lines L5,L6 (FIG. 2). The computer 68 receives temperature signals from the thermocouple T2 and calculates and prints temperature adjusted measurements on the recorder 68a (FIG. 2) of the computer 68. The temperature signal produced as the probe P2 contacts the structural beam 24 also produces a signal to stop and then reverse the drive motor either 56² or 44².

Referring to FIG. 2, the motor 44² is connected by lines L7,L8 to normally open contacts C7,C8 and C9,C10 of a relay R7 of the computer 68 and the motor 56² is connected by lines L9,L10 to normally open contacts C11, C12, C13, C14 of the relay R11 of the computer 68.

The computer 68 (FIG. 2) is operable to close contacts C7,C8 to elevate the block 38² on the fixed screw 40² and to close contacts C9,C10 to lower the block 38² on the fixed screw 40². Similarly, the computer 68 is operable by closure of contacts C11,C12 to move the probe P2 toward the beam 24 and by closure of the contacts C13,C14 to move the probe P1 away from the beam 24.

The computer 68 receives the zero signal from the shaft encoder 66² and the measurement signal from the shaft encoder 66², correlates the zero signal and the measurement signal and prints on the recorder 68a a record of the measurement.

MANUAL OPERATION

For manual operation the motor 44² is connected through a double-pole double-throw reversing switch 74 (FIG. 2) and starting switches 76 to the power supply indicated by the legend AC supply and the shaft encoder 70² is connected to an indicating means, such as a voltmeter 78².

In like manner the motor 56² is connected for manual operation to switch 74a (FIG. 2) and starting switches 76a to the AC supply and the shaft encoder 66² connected to a voltmeter 78²a.

WATER COOLING

For the purpose of keeping the apparatus 20 from becoming heated by structural beam 24, water cooling jackets 79 (FIG. 1) are mounted by brackets 79a from the frame 18 and act as a shield to prohibit heat radiation.

OPERATION

A program is provided for the computer 68 for each size of beam 24 to be measured and describing the various measurement positions desired (indicated, for example, by the dotted line positions of the probes P1, P2, P3, P4, FIG. 1) to which block motors 44¹, 44², etc., and probe motors 56¹, 56², etc., usually drive the blocks 38¹, 38², etc., and the probes P1,P2, etc.

Prior to entry of the beam 24 into the apparatus 20 the probes P1,P2, for example, move from the initial position (line A-A, FIG. 3) to the probe contact position (line B-B, FIG. 3) to provide the zero setting for the computer 68. Thereafter the probes P1,P2, etc., return to their respective initial position at line A-A (FIG. 3) and the beam 24 is fed by the conveyor 10 into the apparatus 20 and the probes P1,P2, etc., then move into the probe measuring position (FIG. 1) and engage with the contours (i.e. sides of the flanges 24a, for example) to produce the measurement settings.

ALTERNATIVE EMBODIMENTS

It will be understood by those skilled in the art that alternatively as shown in FIG. 5 the first or block drive means and the second or probe drive means may take the form illustrated by the first or block drive means shown in such FIG. 5. The first fixed helical screw 40² (FIG. 2) is replaced by a guide rod 80. A fluid cylinder 82 has its shell 82a affixed to one of the end block 32a and the mounting block 38⁵ and its piston 82b connected to the other of the end block 32a and the mounting block 38⁵. In this case the piston 82b is connected to the mounting block 38⁵ and the shell 82a to the end block 32a. The fluid cylinder 82 is connected by a four-way valve 84 to the fluid supply and controlled by coils 86a,86b which coils 86a,86b are connected by switches 88a,88b to the AC supply.

The first signal means in this embodiment is a transducer member 90 having its plunger 90a connected to one of the end block 32a and the mounting block 38⁵ (in this case the block 38⁵) and its shell 90b connected to the other of the end block 32a and the mounting block 38⁵ (i.e. the block 32a). The member 90 is of the type similar to models DS1000, DS2000, DS4000 linear displacement transducers manufactured by Daytronic Corporation, Dayton, Ohio.

Alternatively the switches 88a can be replaced by contacts C7,C11 (FIG. 2) of the relays R7,R11 of the computer 68.

SUMMARY OF THE ACHIEVEMENT OF THE OBJECTS OF THE INVENTION

It will be recognized by those skilled in the art that the objects of this invention have been achieved by providing apparatus 20 for measuring a dimension of a member 24, which apparatus 20 tests the dimensional accuracy and symmetry deviation of the member 24 automatically, determines the required dimensional and deviation characteristics of the member 24 while such member 24 is at operating temperature (about 1600° F.) and at a test point on the manufacturing line or conveyor 10 in which the member 24 is being processed, eliminates the cutting of a sample from the member 24 and the associated cooling period for cooling the sample to room temperature, permits the conversion of the test results at operating temperature to room temperature by automatic calibration, a calibration chart or the like, is operable to handle a wide range of members 24 and to cover a wide variety of test positions on the member 24 for one fixed position of the apparatus 20, is operable to determine tilt, waviness or symmetry of the member 24 and provides contour measurement of a dimension of a member 24 defined by opposed contours of the member 24.

While in accordance with the patent statues a preferred and alternative embodiments of this invention have been illustrated and described in detail, it is to be particularly understood that the invention is not limited thereto or thereby.

I claim:

1. Apparatus for the contour measurement of a dimension of a member, said dimension being defined by opposed contours, said apparatus having:
   a. a frame adapted to receive said member therein and having opposed guide means disposed adjacent to said opposed contours,
   b. opposed sensing assemblies reciprocable on said opposed guide means adjacent to said opposed contours,
      1. each of said sensing assemblies having:
         a. mounting means reciprocable on said guide means;
         b. a first elevating drive means connected to said mounting means for reciprocating said mounting means on said guide means adjacent said contour;
         c. a probe reciprocable in said mounting means between an initial position away from said contour, a probe contact position which provides zero settings for said apparatus and a probe measuring position in engagement with said contour;
         d. a second lateral drive means connected to said probe for reciprocating said probe between said initial position, said probe contact position and said probe measuring position; and
         e. a first signal means associated with said probe and operable to produce a zero signal when said probe is in said probe contact position and to produce a measurement signal when said probe is in the probe measuring position; and
   c. control means connected to said first elevating drive means, said second lateral drive means and said first signal means,
      1. said control means being operable to cause said first elevating drive means to move said probe along said contour;

2. said control means being operable to cause said second lateral drive means to move said probe between said initial position, said probe contact position and said probe measuring position; and
3. said control means being operable to receive said zero signal and said measurement signal, to cause the correlation of said zero signal and said measurement signal and the printing of a record of said dimension; and d. temperature measurement means connected to said probe to sense contact of said probe with said member by the difference in temperature between said probe and said member, said control means being connected to said temperature measurement means to receive temperature signals from said temperature measurement means and to calculate and to print temperature adjusted dimensions.

2. The apparatus recited in claim 1 wherein said control means is also operable to sense contact of said probe with said member and use said temperature signals to stop and reverse said probe by stopping and reversing one of said first elevating drive means and said second lateral drive means.

3. The apparatus recited in claim 1 wherein said control means has a first shaft encoder member connected to said first elevating drive means for sensing linear movement of said probe.

4. The apparatus recited in claim 1 wherein said control means has a first transducer member connected to said mounting means and said frame for measuring the movement of said mounting means.

5. The apparatus recited in claim 1 wherein said control means has a second shaft encoder member connected to said second lateral drive means for sensing linear movement of said probe.

6. The apparatus recited in claim 1 wherein said control means has a second transducer member connected to said probe and said mounting means for measuring movement of said probe.

7. The apparatus recited in claim 1 wherein said first elevating drive means has a first-fixed helical screw on said guide means, a first rotatable member on said mounting means rotatable on said first helical screw and a first rotating means connected to said first rotatable member for rotating said first rotatable member on said first helical screw to cause movement of said sensing assembly with respect to said guide means.

8. The apparatus recited in claim 1 wherein said first elevating drive means has a first fluid cylinder connected to said frame and said mounting means for reciprocating said mounting means with respect to said guide means.

9. The apparatus recited in claim 1 wherein said second lateral drive means has a second helical screw on said probe fixed from rotation but free to reciprocate thereon, a second rotatable member on said mounting means rotatable on said second helical screw, and a second rotating means connected to said second rotatable member for rotating said second rotatable member on said second helical screw to cause reciprocable movement of said probe with respect to said mounting means.

10. The apparatus recited in claim 1 wherein said second lateral drive means has a second fluid cylinder connected to said mounting means and to said probe for reciprocating said probe with respect to said mounting means.

11. The apparatus recited in claim 7 wherein said control means has a first shaft encoder member connected to one of said first rotatable member and said first rotating means for converting rotary motion of said one to movement of said probe.

12. The apparatus recited in claim 8 wherein said control means has a first transducer member connected to said frame and to said mounting means for measuring said movement of said mounting means.

13. The apparatus recited in claim 9 wherein said control means has a second shaft encoder member connected to one of said second rotatable member and said second rotating means for converting rotary motion of said one to movement of said probe.

14. The apparatus recited in claim 10 wherein said control means has a second transducer member connected to said mounting means and to said probe for measuring said movement of said probe.

15. The apparatus recited in claim 1 wherein said control means has a second signal means connected to said first elevating drive means and to the control means, said second signal means being operable to transmit a second output signal to said control means which represents the position of said mounting means.

16. Apparatus for the contour measurement of a dimension of a member, said dimension being defined by a contour, said apparatus having:
   a. a frame adapted to receive said member therein and having guide means disposed adjacent to said contour,
   b. a sensing assembly reciprocable on said guide means adjacent to said contour,
      1. said sensing assembly having:
         a. mounting means reciprocable on said guide means;
         b. a first elevating drive means connected to said mounting means for reciprocating said mounting means on said guide means substantially parallel said contour;
         c. a probe reciprocable in said mounting means between an initial position away from said contour, a probe contact position which provides zero settings for said apparatus and a probe measuring position in engagement with said contour;
         d. a second lateral drive means connected to said probe for reciprocating said probe between said initial position, said probe contact position and said probe measuring position; and
         e. a first signal means associated with said probe and operable to produce a zero signal when said probe is in said probe contact position and to produce a measurement signal when said probe is in the probe measuring position; and
   c. control means connected to said first elevating drive means, said second lateral drive means and said first signal means,
      1. said control means being operable to cause said first elevating drive means to move said probe along said contour;
      2. said control means being operable to cause said second lateral drive means to move said probe between said initial position, said probe contact position and said probe measuring position; and
      3. said control means being operable to receive said zero signal and said measurement signal, to cause the correlation of said zero signal and said measurement signal and the printing of a record of said dimension; and
   d. temperature measurement means connected to said probe to sense contact of said probe with said member by the difference in temperature between said probe and said member, said control means being connected to said temperature measurement means to receive temperature signals from said temperature measurement means and to calculate and to print temperature adjusted dimensions.

UNITED STATES PATENT OFFICE
CERTIFICATE OF CORRECTION

Patent No. 3,594,909　　　　　Dated　July 27, 1971

Inventor(s) Robert A. Schultz

It is certified that error appears in the above-identified patent and that said Letters Patent are hereby corrected as shown below:

Column 3, line 52, after "$38^2$" insert -- (FIGS. 1,2A,2B, 3,4) --; line 54, cancel "(FIGS. 1,2A,2B,3,4)". Column 4, line 35, cancel "and the" and insert -- with --.

Signed and sealed this 25th day of July 1972.

(SEAL)
Attest:

EDWARD M. FLETCHER, JR.　　　　　ROBERT GOTTSCHALK
Attesting Officer　　　　　　　　　Commissioner of Patents